United States Patent
Hakala (10) Patent No.: US 7,668,830 B2
(45) Date of Patent: Feb. 23, 2010

(54) ACCESS RIGHTS

(75) Inventor: Kimmo Hakala, Tampere (FI)

(73) Assignee: Nokia Corporation, Espoo (FI)

( * ) Notice: Subject to any disclaimer, the term of this patent is extended or adjusted under 35 U.S.C. 154(b) by 346 days.

(21) Appl. No.: 10/998,872

(22) Filed: Nov. 29, 2004

(65) Prior Publication Data

US 2006/0117010 A1 Jun. 1, 2006

(51) Int. Cl.
G06F 17/30 (2006.01)
G06F 7/00 (2006.01)

(52) U.S. Cl. .............................. 707/9; 707/10

(58) Field of Classification Search ............ 707/9, 707/1, 10; 709/229, 202
See application file for complete search history.

(56) References Cited

U.S. PATENT DOCUMENTS

| | | | |
|---|---|---|---|
| 5,566,319 A | 10/1996 | Lenz | |
| 6,236,996 B1 | 5/2001 | Bapat et al. | |
| 6,275,825 B1 * | 8/2001 | Kobayashi et al. | 707/9 |
| 7,035,850 B2 * | 4/2006 | Arai et al. | 707/6 |
| 7,058,630 B2 * | 6/2006 | Houston et al. | 707/9 |
| 7,185,095 B2 * | 2/2007 | Kawamoto et al. | 709/225 |
| 2002/0194295 A1 | 12/2002 | Mercure et al. | |
| 2004/0019801 A1 | 1/2004 | Lindholm et al. | |
| 2004/0255048 A1 | 12/2004 | Lev Ran et al. | |
| 2005/0114672 A1 | 5/2005 | Duncan et al. | |

FOREIGN PATENT DOCUMENTS

| | | |
|---|---|---|
| JP | 11212849 | 8/1999 |
| JP | 11345179 | 12/1999 |
| JP | 2005293513 | 10/2005 |

* cited by examiner

*Primary Examiner*—Baoquoc N To
(74) *Attorney, Agent, or Firm*—Banner & Witcoff, Ltd.

(57) ABSTRACT

A device and method define an access right to a shared data item. The method includes defining a group of one or more contacts in a contact list, assigning an access right to the group of one or more contacts, and assigning the group of one or more contacts to a shared data item. A device and method also provide a service based on the access right to the shared data item. The method includes receiving a request for a service from a user at a second device, the request including a resource identifier, selecting a user identifier for the user, selecting an access group identifier from a contact list using the user identifier, selecting an access right for the user using the access group identifier, determining if the user has permission to access a data item identified by the resource identifier, if the user has permission to access the data item, determining if the access right allows performance of the service, and providing the service at the first device if the access right allows performance of the service.

20 Claims, 3 Drawing Sheets

ACCESS RIGHTS

FIELD OF THE INVENTION

The present invention is related to sharing information among networked devices. More specifically, the present invention relates to controlling access to files in a shared file system.

BACKGROUND OF THE INVENTION

In addition to processing voice calls from both wired and wireless phones, handheld communication devices now also communicate with other types of devices such as computers of all form factors, Personal Digital Assistants (PDAs) or handheld PCs, Integrated Communication Devices (ICDs), etc. Additionally, communication devices have merged the capabilities of cellular telephones, PDAs, ICDs, and computing devices and now provide increasingly sophisticated applications. Applications provide the communication device with the ability to perform a wide variety of tasks including drafting documents, preparing presentations, creating movies and music, taking pictures, maintaining schedules, etc. The output of these applications is typically a file that is saved to a memory accessible by the communication device. Because the communication device may be connected to various networks, it is desirable to share the resulting files with other devices on the network. For example, it is desirable to save a video file of a new baby using a cellular telephone and allow friends and family to view the video stored at the cellular telephone without sending the video file to each person using e-mail. Sharing of files and folders is less time consuming than physically sending the files to others using the network and requires less disk space by not requiring that a redundant copy be stored at another device.

Web-based Distributed Authoring and Versioning (Web-DAV) is a standardized, platform-independent set of extensions to the HyperText Transfer Protocol (HTTP) 1.1. WebDAV provides users with the ability to edit and to manage files remotely over a network by standardizing the functions necessary to move a file, to copy a file, to lock or unlock a file, to delete a file, to add property information to a file, etc., all without having direct access to the device storing the file. Thus, using WebDAV, a user can access a file system on a server accessible through a network using a browser or other software from multiple locations including home, work, school, while traveling, etc.

WebDAV additionally provides for the specification of access rights to files. Currently, however, there is not a solution to the problem of providing access control management to remote network file systems in handheld communication devices. The Internet Official Protocol Standards include HTTP authentication using Basic and/or Digest authentication. However, after authenticating a user to the server, the server "owner" may want to restrict some users to accessing a certain set of files while allowing other users to edit and/or to read a larger set of files at the server.

Most computer operating systems provide a multiple access computing environment that restricts user access to files in a file system based on the group to which the user belongs and on the group access rights defined for a specific file or folder. However, these access control systems are not easily understood or configured by the typical communication device user. As a result, many users may choose to avoid defining the access rights altogether or may define the access rights incorrectly. Thus, what is needed is an easily understandable method and device for defining access rights to a shared data item in a communication device environment.

SUMMARY OF THE INVENTION

An exemplary embodiment of the invention relates to a method of providing a service based on an access right to a shared data item. The method includes, but is not limited to, receiving a request for a service at a first device from a user at a second device, the request including a resource identifier; selecting, at the first device, a user identifier for the user; selecting an access group identifier at the first device from a contact list using the user identifier; selecting an access right for the user using the access group identifier; determining if the user has permission to access a data item identified by the resource identifier; if the user has permission to access the data item, determining if the access right allows performance of the service; and providing the service at the first device if the access right allows performance of the service.

Another exemplary embodiment of the invention relates to a method of defining an access right for a shared data item. The method includes, but is not limited to, defining a group of one or more contacts in a contact list; assigning an access right to the group of one or more contacts; and assigning the group of one or more contacts to a shared data item.

Still another exemplary embodiment of the invention relates to one or more computer-readable media having computer-readable instructions stored thereon that, upon execution by a processor, cause the processor to provide a service based on an access right to a shared data item. The instructions include computer code configured to receive a request for a service from a user at a second device, the request including a resource identifier, to select a user identifier for the user, to select an access group identifier from a contact list using the user identifier, to select an access right for the user using the access group identifier, to determine if the user has permission to access a data item identified by the resource identifier, if the user has permission to access the data item, to determine if the access right allows performance of the service, and to provide the service if the access right allows performance of the service.

Still another exemplary embodiment of the invention relates to one or more computer-readable media having computer-readable instructions stored thereon that, upon execution by a processor, cause the processor to define an access right to a shared data item. The instructions include computer code configured to define a group of one or more contacts in a contact list, to assign an access right to the group of one or more contacts, and to assign the group of one or more contacts to a shared data item.

Still another exemplary embodiment of the invention relates to a device for providing a service based on an access right to a shared data item. The device includes, but is not limited to, a communication interface, an access controller, a memory, and a processor. The communication interface is configured to receive a request for a service from a user at a second device. The request includes a resource identifier. The access controller includes, but is not limited to, computer code configured to select a user identifier for the user from the received request, to select an access group identifier from a contact list using the user identifier, to select an access right for the user using the access group identifier, to determine if the user has permission to access a data item identified by the resource identifier, if the user has permission to access the data item, to determine if the access right allows performance of the service, and to provide the service if the access right allows performance of the service. The memory stores the access controller. The processor couples to the memory and the communication interface and executes the access controller.

Still another exemplary embodiment of the invention relates to a device for defining an access right to a shared data item. The device includes, but is not limited to, an access controller, a memory, and a processor. The access controller includes, but is not limited to, computer code configured to define a group of one or more contacts in a contact list, to assign an access right to the group of one or more contacts, and to assign the group of one or more contacts to a shared data item. The memory stores the access controller. The processor couples to the memory and is configured to execute the access controller.

Still another exemplary embodiment of the invention relates to a system for providing a service based on an access right to a shared data item. The system includes, but is not limited to, a first device and a second device. The first device is configured to send a request for a service to the second device. The request includes a resource identifier. The second device includes, but is not limited to, a second communication interface, an access controller, a memory, and a processor. The second communication interface is configured to receive the request for the service from a user at the first device. The access controller includes, but is not limited to, computer code configured to select a user identifier for the user from the received request, to select an access group identifier from a contact list using the user identifier, to select an access right for the user using the access group identifier, to determine if the user has permission to access a data item identified by the resource identifier, if the user has permission to access the data item, to determine if the access right allows performance of the service, and to provide the service if the access right allows performance of the service. The memory stores the access controller. The processor couples to the memory and the second communication interface and is configured to execute the access controller.

Still another exemplary embodiment of the invention relates to a system for defining an access right to a shared data item. The system includes, but is not limited to, a first device and a second device. The first device is configured to send a request for a service from a contact at the first device. The second device includes, but is not limited to, a second communication interface, an access controller, a memory, and a processor. The second communication interface is configured to receive the request for the service from the contact at the first device. The access controller includes, but is not limited to, computer code configured to define a group of one or more contacts in a contact list, to assign an access right to the group of one or more contacts, to assign the group of one or more contacts to a shared data item, to determine a location of the first device, and to add the contact to the group of one or more contacts in the contact list if the location of the first device is within a defined distance from the second device. The memory stores the access controller. The processor couples to the memory and the second communication interface and is configured to execute the access controller.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

DETAILED DESCRIPTION OF THE INVENTION

Data items can be shared on a handheld communication device, for example using WebDAV. A shared item may be a file, a folder, a directory, or any other data item that is then accessible by users at other devices. WebDAV follows the client/server operational paradigm. Thus, WebDAV server software may be installed on the handheld communication device to act as the server and to provide the shared data item. WebDAV client software may be installed on the other device to allow the user of the other device to view and to access the shared data item. The shared data item may be an item in a shared file system that may be accessed as a mapped network drive. Because WebDAV is an extension of HTTP, the shared file system can be accessed using a communication technology based on the Transmission Control Protocol/Internet Protocol (TCP/IP). Additionally, because WebDAV is an international standard, a WebDAV client can communicate with virtually any WebDAV server. Alternative technologies to WebDAV may be utilized to allow sharing of data items as known to those skilled in the art now and in the future.

By way of exemplification, the current invention is described with reference to the WebDAV technology. The WebDAV client device typically requests a service from the WebDAV server device. Example request methods to perform a service that are supported under WebDAV include:

GET which returns any resource requested using a Uniform Resource Locator (URL), POST which posts data, such as electronic mail, news, or forms data, PUT which stores a resource on the server, DELETE which removes a resource from the server or removes a collection, MKCOL which creates a new collection, PROPFIND which retrieves properties of resources and collections, PROPPATCH which sets properties of resources and collections, COPY which copies collections and resources within the context of a namespace, MOVE which moves collections and resources within the context of a namespace, LOCK which sets a lock on collections or resources for overwrite protection, and UNLOCK which removes locks from collections or resources.

However, before a request for service is performed by the WebDAV server device, the user at the other device should normally be identified and authenticated.

The WebDAV client device may authenticate itself to the WebDAV server device using the HTTP authentication schemes, Basic authentication or Digest authentication, at the beginning of a session. As known to those skilled in the art, other authentication schemes also may be used. HTTP provides a challenge-response authentication mechanism that may be used by a server to challenge a client request and by a client to provide authentication information. An extensible, case-insensitive token may also be used to identify the authentication scheme (i.e., Basic or Digest). The authentication scheme may be followed by a comma-separated list of attribute-value pairs, for example, that carry the parameters necessary to authenticate the client with the server using the specified authentication scheme.

The Basic authentication scheme is based on the concept that the client authenticates itself with a valid user-ID and password before the server performs the requested service. By way of example, to receive authorization, the client sends the user-ID and password separated by a single colon character within a base64 encoded string. A client may preemptively send the corresponding Authorization header with the request to access a resource at the server instead of waiting for the challenge. The server device confirms the validity of the password by looking up the password that corresponds to the submitted user-ID. If the passwords match, the client device is authenticated.

Like Basic access authentication, the Digest authentication scheme is based on the HTTP challenge-response mechanism. The Digest scheme, however, challenges using a "nonce" value. A valid response by the client device contains a checksum of the user-ID, the password, the given nonce value, the HTTP method, and the requested Uniform Resource Identifier (URI). The nonce value provides an additional input to the authentication algorithm and allows the server to effect the digest value without control by the client. As a result, use of the nonce value increases the security of the authentication mechanism. To authenticate the client device, the server device compares the digest value received from the client device with a digest value computed by the server device. If the digest values match, the client device must have used the same nonce and password as the server device, so the client device is authenticated.

To challenge the authorization of a client device, for example, to access the shared data item, the server device may send a 401 (Unauthorized) response message to the client device. The client device may respond to the authentication request from the server device by including an Authorization header field with the request. The Authorization header field includes the credentials necessary to authenticate the client device with the server. After receiving the Authorization header, the server device executes the appropriate authentication scheme. After successful authentication at the server device, the server device includes an Authentication-Info header in the response to communicate information relative to the successful authentication to the client device.

The identification and authentication of the client device using the authentication scheme is performed at the beginning of a session. If the server device already knows the client device, the client device employs an authentication scheme as just described. However, if the client device and server device have not exchanged authentication information, the server device may identify the client device as an anonymous client. An Access Control element controls access to the shared data item at the server device based on the identification of the client device.

When a client device attempts to access the shared data item at the server device, the Access Control element compares the identity of the client device to information contained in a Contact List at the server device. The identity information may comprise, for example, a name of the user at the client device, a phone number of the client device, an authentication code, an e-mail URI of the user at the client device, and/or a URL homepage of the user at the client device. In a mobile device, for example, a contact added to a Contact List may be represented by contact cards similar to business cards. Many devices include modifiable templates for creating a contact card so that the user can include the desired information. A contact card may include different details for a contact including their name, their company or employer name, their job title, various telephone numbers, a fax number, their e-mail address, their work or home address, their birthday, a picture of the contact, or a note created by the user relating to the contact. A contact card may be created by the user, or they may also be received as a fax, e-mail, short message, etc. using various communication technologies including infrared or Bluetooth. When creating the Contact List at the server device, the user of the server device may assign the contact to an access group. If the identity of the client device matches the corresponding identity information in the Contact List at the server device, the access group assigned for the contact is identified.

The server device responds to requests by the client device based on the access rights granted to the access group to which the contact associated with the client device may have been assigned. The user of the server device may define the access rights for the access group. For example, the user specifies whether or not the access group can get, copy, delete, lock/unlock, etc. files in the shared file system. An access group may be assigned a name that identifies the members of the group. For example, "Anonymous" may be used to identify a client device that is not found in the Contact List. The "Anonymous" group also may be used as a default group if a contact is not assigned to an access group. "Family" may be used to identify a client device associated with a contact in the Contact List that is a close friend or family member. "Co-workers" may be used to identify a client device associated with a contact in the Contact List that works with the user.

It is also possible that the same person may have multiple contact information entries in the Contact List. For example, the same name may be associated with a personal cell phone number and a work cell phone number. Different cell phone numbers may be assigned to different access groups. As a result, the same person may have different access rights based on the client device that is attempting to access the shared data items. However, because this may not be user friendly in some cases, it may be advantageous that even though the same name is associated with multiple contact information entries in the Contact List, the user still has the same access rights irrespective of the different identities. One method of associating multiple identities with a person is that the server device assigns the access rights to a person based on different HTTP authentication usernames. In other words, an authentication process may comprise reading the username and evaluating the access right. HTTP authentication usernames may have an automatic categorization, for example, a person's login name could be categorized as "friends" or "family". Alternatively, the access rights may be determined so that the name that the different numbers are associated with is regarded as the identity.

In defining the access right to the group, the user may select the name of the group and then switch on or off various services associated with potential requests from the client device. The access group access right may be stored in a memory accessible by the server device. The access group access right may be reviewed later, for example, through the server device "settings" option or a "control panel" option. Also, the members of an access group may be reviewed later. The access groups defined by the user at the server device may be linked to the Contact List so that the user can assign a contact to an access group, for example, using a drop down menu list that displays the defined access groups.

The access group need not be created by the user. An access group may be automatically created, defined, updated, and selected based on rules. For example, a member of an access group may be removed automatically if a long period of time has passed since the last contact with the member. As another example, an access group may be created, defined, updated, and selected based on the location of the client device. As known to those skilled in the art, a number of mechanisms exist for determining a location of a client device. Based on the location information, if the client device is "close" to the server device, a "Proximity" group may be created having access rights. Thus, the members of the group may change dynamically and without manual intervention by the user.

According to an embodiment, the user at the server device creates a shared folder at the server device. The user also may add files and/or folders to the shared folder to create a shared file system of data items that include the files and/or folders. For a file and/or a folder, the user at the server device specifies one or more access group that may access the file and/or folder. This may include sub-folders of a folder. The one or more access group is associated with the data items. For example, the user at the server device may add one or more access groups delineated by a "," to the name of the file and/or folder creating a comma-separated list. However, there are additional methods of associating an access group with a shared data item as known to those skilled in the art. The access groups defined by the user at the server device may be linked to a file manager application so that the user can assign a file and/or folder to a group, for example, using a drop down menu list that displays the defined access groups. A default group may be defined for a file and/or folder. If an access group is listed, the contacts in that access group have the access right granted to that group to access the data item. If the access group is not listed, a contact in that group has no access right to the data item. For example, a client device identified in the "Anonymous" group may not be allowed access to portions of or possibly any of the shared file system. A client device identified in the "Co-Worker" group may be allowed access to files and/or folders related to work, but not to personal files and/or folders. An access group may include only a single contact to allow the user at the server device to set access rights for a file and/or folder to a specific user.

The Access Control element compares the request received from the client device to the access right assigned to the contact through the selected access group. For example, a GET request method may be received from the client device. A URL to the data item at the server device is included in the GET request method. Thus, the Access Control element determines the access group or groups that may access the requested data item that may be a file or a folder. The Access Control element determines if the access group assigned to the contact at the client device is allowed access to the data item in the shared file system. If access is allowed, the specific access right is determined from the stored access right for the access group. The access right is compared to the request. If the access is allowed, the requested service is performed by the server device. Otherwise, the requested service is not performed. If the contact is not assigned to an access group, a default access group may be used to define access rights for the contact. For example, an "Anonymous" access group may be used.

Figure 1:
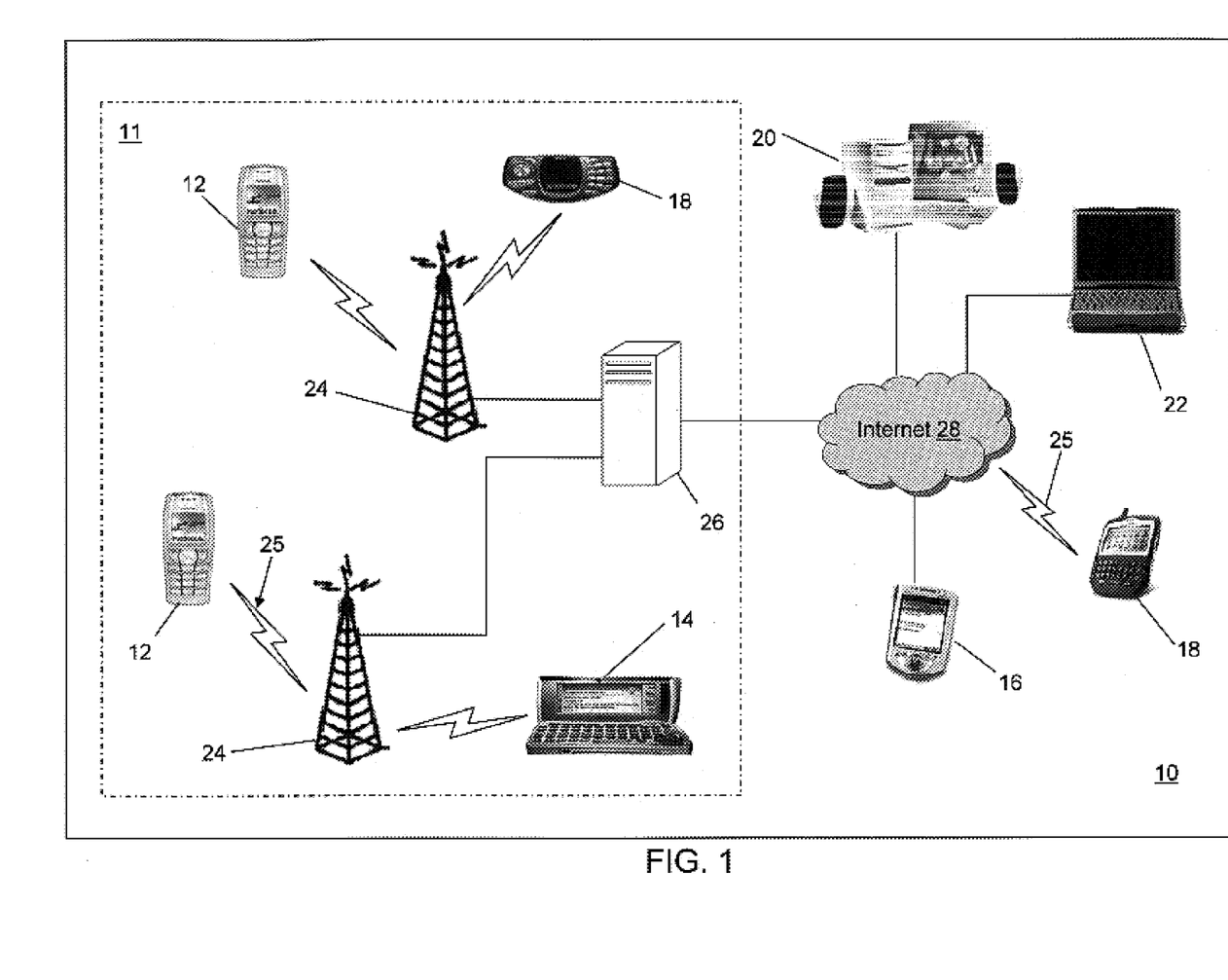
FIG. 1 is an overview diagram of a system in accordance with an exemplary embodiment.

With reference to FIG. 1, the system 10 is comprised of multiple communication devices that can communicate through a network. The system 10 may comprise any combination of wired or wireless networks including, but not limited to, a cellular telephone network, a wireless Local Area Network (LAN), a Bluetooth personal area network, an Ethernet LAN, a token ring LAN, a wide area network, the Internet, etc. The system 10 may include both wired and wireless communication devices. For exemplification, the system 10 shown in FIG. 1 includes a cellular telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a cellular telephone 12, a combination PDA and cellular telephone 14, a PDA 16, an ICD 18, a desktop computer 20, and a notebook computer 22. Some or all of the communication devices may send and receive calls and messages and communicate with service providers through a wireless connection 25 to a base station 24. The base station 24 may be connected to a network server 26 that allows communication between the cellular telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), General Packet Radio Service (GPRS), TCP/IP, Bluetooth, IEEE 802.11, etc. A communication device may communicate using various media including, but not limited to, radio, infrared, laser, cable connection, and the like.

Figure 2:
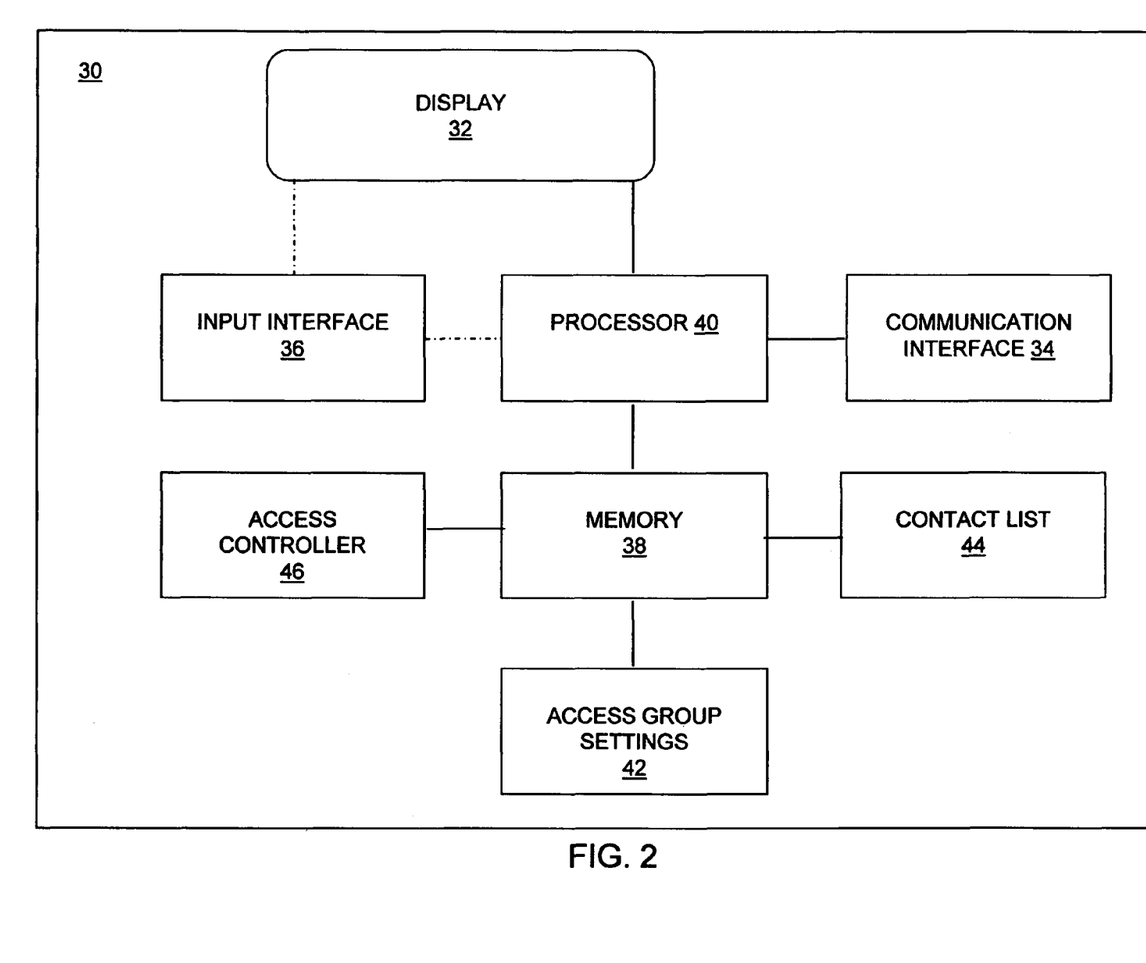
FIG. 2 is a block diagram of a device in accordance with an exemplary embodiment.

In an exemplary embodiment, the communication device 30, as shown in FIG. 2, comprises a display 32, a communication interface 34, an input interface 36, a memory 38, a processor 40, an access group settings utility 42, a contact list 44, and an access controller 46. Different and additional components of communication device 30 may be incorporated into the communication device 30 and/or the system 10. Additionally, the device 30 need not include all of the components depicted in FIG. 2.

The display 32 presents information to a user. The display 32 may be, but is not limited to, a thin film transistor (TFT) display, a light emitting diode (LED) display, a Liquid Crystal Display (LCD), a Cathode Ray Tube (CRT) display, etc.

The communication interface 34 provides an interface for receiving and transmitting calls, messages, and any other requests communicable between devices. The communication interface 34 may use various transmission technologies including, but not limited to, CDMA, GSM, UMTS, TDMA, TCP/IP, GPRS, Bluetooth, IEEE 802.11, etc. to transfer content to and from the device.

The input interface 36 provides an interface for receiving information from the user for entry into the device 30. The input interface 36 may use various input technologies including, but not limited to, a keyboard, a pen and touch screen, a mouse, a track ball, a touch screen, a keypad, one or more buttons, etc. to allow the user to enter information into the device 30 or to make selections. The input interface 36 may provide both an input and output interface. For example, a touch screen both allows user input and presents output to the user.

The memory 38 is the electronic holding place for the operating system, the access group settings 42, the contact list 44, the access controller 46, and/or other applications and data so that the information can be reached quickly by the processor 40. The device 30 may have a plurality of memories 38 using different memory technologies including, but not limited to, Random Access Memory (RAM), Read Only Memory (ROM), flash memory, etc. The data in RAM is volatile meaning that it remains only as long as the device is turned on. When the device is turned off, RAM loses its data.

The values stored in ROM are always there, whether the device is on or not. Flash memory is a type of constantly-powered non-volatile memory that can be erased and reprogrammed in units of memory called blocks.

The group settings utility 42 is an organized set of instructions that, when executed, cause the communication device 30 to behave in a predetermined manner. The group settings utility 42 may allow the user of the device 30 to create, to delete, to rename, to edit, etc. the access right for access groups defined by the user. The instructions may be written using one or more programming languages, assembly languages, scripting languages, etc.

Similarly, the contact list 44 is an organized set of instructions that allow the user to define contacts and information identifying the contacts. The identifying information may include, but is not limited to, a name of the contact, a phone number of the contact, an authentication code for the contact, an e-mail URI of the contact, and/or a URL homepage of the contact. A contact in the contact list 44 may be assigned to one of the access groups defined by the user using the group settings utility 42. It is not necessary that all of the contacts be included in a group. The user may define the access groups either before or after the contact list assignment to an access group. Thus, the user may select from previously defined access groups defined in the group settings utility 42 or may define a new group. A contact may be defined to a default access group. For example, a contact may be assigned to an "Anonymous" group that has restricted rights.

Figure 3:
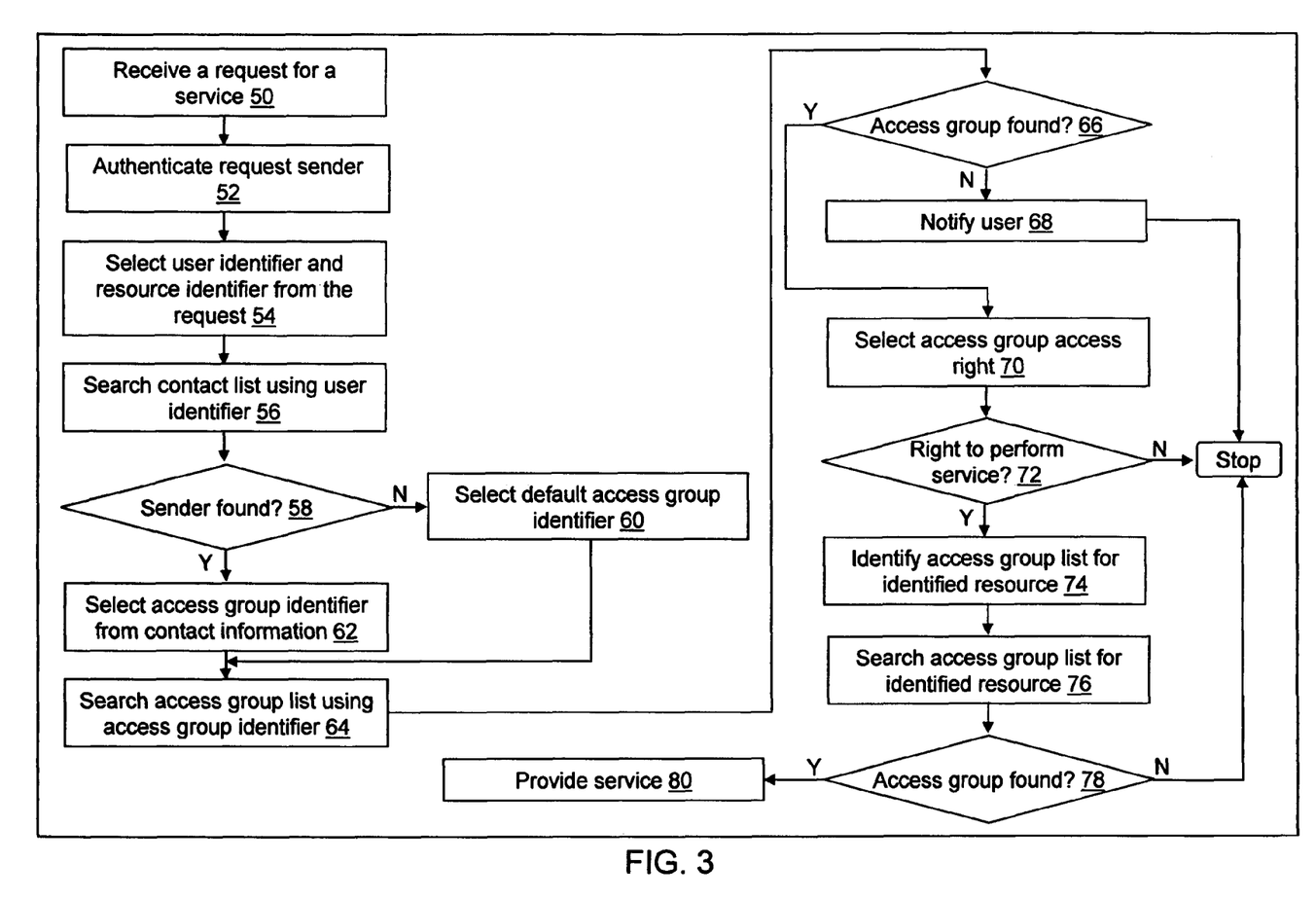
FIG. 3 is a flowchart in accordance with an exemplary embodiment.

Similarly, the access controller 46 is an organized set of instructions that performs the functions of the Access Control element. With reference to FIG. 3, the operations of the Access Control element are described. The operations may be changed in order of execution without deviating from the spirit of the invention. As known to those skilled in the art, the operations may be implemented using various algorithms. At operation 50, the access controller 46 receives a request, from a user at a second device, to provide a service to the user at the second device. For example, using WebDAV, the user at the second device may request a service through a request method that includes, but is not limited to, GET, PUT, POST, MKCOL, DELETE, COPY, MOVE, LOCK, UNLOCK, PROPFIND, and PROPPATCH. Each of the request methods includes a resource or a collection at the device 30 or a resource or a collection to send to the device 30.

At operation 52, the sender of the request, also referred to as the user at the second device, may be authenticated using HTTP authentication. In an exemplary embodiment, the Basic and/or Digest authentication schemes may be used to authenticate the user. At operation 54, a user identifier and a resource identifier are selected from the request that may include the Authorization header field. The user identifier identifies the user of the second device. At operation 56, the access controller searches a contact list using the user identifier to identify the access group to which the sender has been assigned. The contact list includes contact identity information for each contact in the list where the contact information includes, but is not limited to, a name of the contact, a phone number of the contact, an authentication code for the contact, an e-mail URI of the contact, and/or a URL homepage of the contact. The user identifier may match any of the contact identity information. Thus, the user identifier may be a name of the sender, a phone number of the sender, an e-mail URI of the sender, etc.

The decision at operation 58 determines if the sender of the request is found in the contact list using the user identifier and the contact identity information. If the sender is not found in the contact list, at operation 60, a default access group may be selected for the sender to assign default access rights. For example, the sender may be assigned to an "Anonymous" access group or an "Unknown" access group with a corresponding access group identifier such as "Anonymous" or "Unknown." If the sender is found in the contact list, at operation 62, an access group identifier is selected from the contact list contact information. The user at the device 30 may assign a contact to an access group when the contact is added to the contact list.

At operation 64, the access controller searches an access group list using the access group identifier to identify an access right for the identified access group. The user at the device 30 assigns the access right to an access group in the access group list. An access group may not have any access right at all meaning that a user at a second device assigned to that access group has no right to the provision of any service on the device 30. For example, an "Unknown" sender of the request may have no access to the shared data item at the device 30. The access right may include a plurality of services. For example, a "Friend" access group may have an access right that includes the ability to GET, PUT, POST, MKCOL, COPY, and MOVE a data item of the shared file system at the device 30. The data item of the shared file system may include files and/or folders/sub-folders.

The decision at operation 66 determines if the access group of the sender of the request is found in the access group list using the access group identifier. If the access group is not found in the access group list, at operation 68, the user at the device 30 may be notified that an access group selected for a contact was not found in the access group list. Processing stops, and the service requested by the user at the second device is not provided by the device 30. If the access group is found in the access group list, at operation 70, the access right assigned to the access group is selected from the access group list.

The decision at operation 72 determines if the access group of the sender of the request may perform the service requested. For example, the request may be a WebDAV DELETE request method. The access right assigned to the access group may not allow a member of the access group to delete a resource at the device 30. As a result, the service would not be provided at the device 30, and processing stops. If the access group has permission to perform the service requested, at operation 74, an access group list is identified for the resource identified by the resource identifier. The access group list for the resource is defined by the user at the device 30 and comprises a list of access groups that have permission to access the resource based on the access right assigned to the access group. One or more access group may be included in the access group list for the resource. The access group list, for example, may be added to the name of the resource where each access group is separated from the resource name and each other by a ",", creating a comma-separated list. However, there are other methods of associating an access group with the resource as known to those skilled in the art.

At operation 76, the access group list is searched using the access group identifier. The decision at operation 78 determines if the access group identifier is found in the access group list of the resource. If the access group identifier is found in the access group list of the resource, the service requested by the user at the second device is provided at operation 80. If the access group identifier is not found in the access group list of the resource, processing stops, and the service requested by the user at the second device is not provided by the device 30.

The access controller 46 may additionally dynamically create, define, update, and select an access group based on rules that may be defined and or updated by the user. For example, a member of an access group may be removed automatically from the access group if a long period of time has passed since the last contact with the member. As another example, an access group may be created, defined, updated, and selected based on the location of the client device. If the client device is "close" to the server device, a "Proximity" group may be created automatically and assigned an access right. Determining if the client device is "close" to the server device may be based on determining the distance between the client device and the server device using the location information and comparing the distance to a threshold distance. If the client device is located within the threshold distance, the client device is "close" to the server device; otherwise, the client device is not "close" to the server device. Thus, the access group and the members of the access group may change without manual intervention by the user.

Contact information may also be defined for the client device automatically by the access controller 46. A request for a service is received from a user of the client device. The request may include the contact information that is selected from the request and added to the contact list for the user of the client device.

The processor 40 may retrieve a set of instructions such as the access controller 46 or the group settings utility 42 from a non-volatile or a permanent memory and copy the instructions in an executable form to a temporary memory. The temporary memory is generally some form of RAM. The processor 40 executes an application or a utility, meaning that it performs the operations called for by that instruction set. The processor 40 may be implemented as a special purpose computer, logic circuits, hardware circuits, etc. Thus, the processor 40 may be implemented in hardware, firmware, software, or any combination of these methods.

The group settings utility 42, the contact list 44, the access controller 46, the operating system, and other applications may be executed by the same processor 40. Alternatively, group settings utility 42, the contact list 44, the access controller 46, the operating system, and other applications may be executed by different processors. The group settings utility 42, the contact list 44, the access controller 46, the operating system, and other applications may be written in the same or different computer languages including, but not limited to high level languages, scripting languages, assembly languages, etc.

It is understood that the invention is not confined to the particular embodiments set forth herein as illustrative, but embraces all such modifications, combinations, and permutations as come within the scope of the following claims. Thus, the description of the exemplary embodiments is for purposes of illustration and not limitation.

What is claimed is:

1. A method comprising:
   receiving a request for a service at a first device from a user at a second device, the request including a resource identifier and identity information corresponding to the second device;
   authenticating the second device at the first device using a device log-in and password;
   identifying the user of the second device comprising:
      accessing a contact list at the first device,
      comparing, at the first device, the identity information received from the second device and information within the accessed contact list,
      selecting a user identifier corresponding to the user of the second device as any identity information which matches the contact list information when a match is determined, wherein the user identifier is different than the device log-in and password, and wherein the matched information includes a phone number of the second device;
   selecting an access group identifier at the first device from the contact list using the user identifier;
   selecting an access right for the user using the access group identifier;
   determining if the user has permission to access a data item identified by the resource identifier;
   when the user has permission to access the data item, determining if the access right allows performance of the service; and
   providing the service at the first device when the access right allows performance of the service.

2. The method of claim 1, wherein selecting the access group identifier for the user comprises:
   searching the contact list using the user identifier; and
   selecting the access group identifier from the contact list information that corresponds to the user identifier when the user identifier is found in the contact list.

3. The method of claim 1, wherein determining if the user has permission to access the data item comprises:
   identifying a resource access group list for the data item;
   searching the resource access group list using the access group identifier; and
   determining that the user has permission to access the data item when the access group identifier is found in the resource access group list.

4. The method of claim 1, wherein identifying the user of the second device further comprises:
   determining that the user corresponding to the matched phone number has an alternative corresponding phone number within the contact list, wherein the matched phone number and alternative corresponding phone numbers are associated with different access group identifiers;
   in response to determining that the matched phone number and alternative corresponding phone numbers are associated with different access group identifiers, determining a HTTP authentication username corresponding to the user; and
   designating the HTTP authentication username as the user identifier in place of the identity information which matched the contact list information, wherein the HTTP authentication user corresponds to a same or different access group identifier as the matched phone number.

5. The method of claim 1, wherein the identity information comprises at least one of: an authentication code, an email uniform resource identifier (URI), and a uniform resource locator (URL).

6. One or more computer-readable storage media having computer-readable instructions stored thereon that, upon execution by a processor of a first device, cause the processor to perform:
   receiving a request for a service from a user at a second device, the request including a resource identifier and identity information corresponding to the second device;
   authenticating the second device using a device log-in and password;
   identifying the user of the second device comprising:
      accessing a contact list at the first device,
      comparing the identity information received from the second device and information within the accessed contact list, selecting a user identifier corresponding to the user of the second device as any identity information which matches the contact list information when a match is determined, wherein the user identifier is different than the device log-in and password, and wherein the matched information includes a phone number of the second device;

selecting an access group identifier from the contact list using the user identifier, the contact list including, for each contact, contact identity information;

selecting an access right for the user using the access group identifier;

determining if the user has permission to access a data item identified by the resource identifier;

when the user has permission to access the data item, determine if the access right allows performance of the service; and providing the service when the access right allows performance of the service.

7. The computer-readable storage media of claim 6, wherein the instructions causing the processor to perform selecting the access group identifier for the user further comprise:

searching the contact list using the user identifier; and selecting the access group identifier from the contact list information that corresponds to the user identifier when the user identifier is found in the contact list.

8. The computer-readable storage media of claim 6, wherein the instructions causing the processor to perform determining if the user has permission to access the data item further comprise:

identifying a resource access group list for the data item;

searching the resource access group list using the access group identifier; and determining that the user has permission to access the data item when the access group identifier is found in the resource access group list.

9. The computer readable storage media of claim 6, wherein the instructions causing the processor to perform identifying the user of the device further comprises:

determining that the user corresponding to the matched phone number has an alternative corresponding phone number within the contact list, wherein the matched phone number and alternative corresponding phone numbers are associated with different access group identifiers;

in response to determining that the matched phone number and alternative corresponding phone numbers are associated with different access group identifiers, determining a HTTP authentication username corresponding to the user; and designating the HTTP authentication username as the user identifier in place of the identity information which matched the contact list information, wherein the HTTP authentication user corresponds to a same or different access group identifier as the matched phone number.

10. The one or more computer-readable storage media of claim 6, wherein the identity information comprises at least one of: an authentication code, an email uniform resource identifier (URI), and a uniform resource locator (URL).

11. An apparatus comprising:

a processor; and a memory having stored therein computer executable instructions that when executed by the processor, cause the apparatus to:

receive a request for a service from a user at a different device, the request including a resource identifier and identity information corresponding to the different device;

authenticate the different device using a device log-in and password received from the different device;

identify the user of the different device comprising:
  accessing a contact list at the apparatus,
  comparing the identity information received from the different device and information within the contact list accessed,
  selecting a user identifier corresponding to the user of the different device as any identity information which matches the contact list information when a match is determined, wherein the user identifier is different than the device log-in and password, and wherein the matched information includes a phone number of the different device;

select an access group identifier from a contact list using the user identifier, the contact list including, for each contact, contact identity information;

select an access right for the user using the access group identifier;

determine if the user has permission to access a data item identified by the resource identifier;

when the user has permission to access the data item, determine if the access right allows performance of the service; and provide the service when the access right allows performance of the service.

12. The apparatus of claim 11, wherein selecting the access group identifier further includes:

searching the contact list using the user identifier; and selecting the access group identifier from the contact list information that corresponds to the user identifier when the user identifier is found in the contact list.

13. The apparatus of claim 11, wherein determining if the user has permission to access the data item comprises:

identifying a resource access group list for the data item;

searching the resource access group list using the access group identifier; and determining that the user has permission to access the data item when the access group identifier is found in the resource access group list.

14. The apparatus of claim 11, wherein identifying the user of the device comprises:

determining that the user corresponding to the matched phone number has an alternative corresponding phone number within the contact list, wherein the matched phone number and alternative corresponding phone numbers are associated with different access group identifiers;

in response to determining that the matched phone number and alternative corresponding phone numbers are associated with different access group identifiers, determine a HTTP authentication username corresponding to the user; and designating the HTTP authentication username as the user identifier in place of the identity information which matched the contact list information, wherein the HTTP authentication user corresponds to a same or different access group identifier as the matched phone number.

15. The apparatus of claim 11, wherein the identity information comprises at least one of: an authentication code, an email uniform resource identifier (URI), and a uniform resource locator (URL).

16. A system comprising:
a first device, the first device configured to send a request for a service to a second device, the request including a resource identifier and identity information corresponding to the first device; and
the second device configured to receive the request for the service from a user at the first device;
the second device further comprising:
   an access controller, the access controller comprising computer code configured to:
      authenticate the first device at the second device using a device log-in and password;
      identify the user of the first device comprising:
         accessing a contact list at the second device,
         comparing, at the second device, identity information received from the first device and information within the contact list accessed by the second device,
         selecting a user identifier corresponding to the user of the first device as any identity information which matches the contact list information when a match is determined, wherein the user identifier is different than the device log-in and password, and wherein the matched information includes a phone number of the first device;
      select an access group identifier from a contact list using the user identifier, the contact list including, for each contact, contact identity information;
      select an access right for the user using the access group identifier;
      determine if the user has permission to access a data item identified by the resource identifier;
      when the user has permission to access the data item, determine if the access right allows performance of the service; and
      provide the service when the access right allows performance of the service;
   a memory, wherein the memory stores the access controller; and
   a processor coupled to the memory and the second communication interface, the processor configured to execute the access controller.

17. The system of claim 16, wherein the computer code configured to select the access group identifier for the user comprises computer code configured to:
   search the contact list using the user identifier;
   select the access group identifier from the contact list information that corresponds to the user identifier when the user identifier is found in the contact list.

18. The system of claim 17, wherein the computer code configured to determine if the user has permission to access the data item comprises computer code configured to:
   identify a resource access group list for the data item;
   search the resource access group list using the access group identifier; and
   determine that the user has permission to access the data item when the access group identifier is found in the resource access group list.

19. The system of claim 16, wherein identifying the user of the first device further comprises:
   determining that the user corresponding to the matched phone number has an alternative corresponding phone number within the contact list, wherein the matched phone number and alternative corresponding phone numbers are associated with different access group identifiers;
   in response to determining that the matched phone number and alternative corresponding phone numbers are associated with different access group identifiers, determining a HTTP authentication username corresponding to the user; and
   designating the HTTP authentication username as the user identifier in place of the identity information which matched the contact list information, wherein the HTTP authentication user corresponds to a same or different access group identifier as the matched phone number.

20. The system of claim 16, wherein the identity information comprises at least one of: an authentication code, an email uniform resource identifier (URI), and a uniform resource locator (URL).

* * * * *